United States Patent
Kassai

(10) Patent No.: US 7,445,281 B2
(45) Date of Patent: Nov. 4, 2008

(54) HEAD GUARD STRUCTURE AND HEAD GUARD PAD OF CHILD EQUIPMENT, AND VEHICULAR CHILD SAFETY SEAT

(75) Inventor: Kenzou Kassai, Osaka (JP)

(73) Assignee: Aprica Kassai Kabushikikaisha, Osaka-shi (JP)

(*) Notice: Subject to any disclaimer, the term of this patent is extended or adjusted under 35 U.S.C. 154(b) by 0 days.

(21) Appl. No.: 11/361,025

(22) Filed: Feb. 21, 2006

(65) Prior Publication Data

US 2006/0208544 A1  Sep. 21, 2006

Related U.S. Application Data

(63) Continuation of application No. 10/110,348, filed as application No. PCT/JP01/06558 on Jul. 30, 2001, now abandoned.

(30) Foreign Application Priority Data

Aug. 31, 2000 (JP) ............... 2000-262612
Apr. 6, 2001 (JP) ............... 2001-108865

(51) Int. Cl.
   *B60R 21/00* (2006.01)
   *B60N 2/42* (2006.01)
   *A47C 7/36* (2006.01)

(52) U.S. Cl. ............... 297/216.11; 297/216.12; 297/220; 297/391; 297/488; 5/636; 5/655

(58) Field of Classification Search ............ 297/216.11, 297/216.12, 220, 250.1, 391, 488; 5/635, 5/636, 655, 603, 622, 637; 2/411, 412, 171
See application file for complete search history.

(56) References Cited

U.S. PATENT DOCUMENTS

| 4,366,587 A | 1/1983 | Takada |
| 4,383,713 A | 5/1983 | Roston |
| 4,402,548 A | 9/1983 | Mason |
| 4,434,513 A | 3/1984 | Welch |
| 4,607,885 A | 8/1986 | del Fierro |
| 4,736,736 A | 4/1988 | Moers et al. |
| 4,773,702 A | 9/1988 | Takahashi et al. |
| 4,779,930 A | 10/1988 | Rosen |

(Continued)

FOREIGN PATENT DOCUMENTS

DE  299 16 249  1/2000

(Continued)

*Primary Examiner*—Joseph F Edell
(74) *Attorney, Agent, or Firm*—W. F. Fasse; W. G. Fasse

(57) ABSTRACT

A head guard arrangement includes a flexible pad (10A) in direct contact with and enclosing the head top region and temporal region of the head of a baby (100), an impact absorption pad (20A) at an outer side of the flexible pad (10A), enclosing the head top region and temporal region of the baby (100), and a fixture pad (30A) having a configuration with an outer perimeter contour that is in accord with the inner perimeter contour of a sidewall (1) of a child seat or carrier or the like so as to fill the gap between the impact absorption pad (20A) and the sidewall (1). With this structure, the head guard arrangement protects the head and brain of an infant against impact injuries.

17 Claims, 12 Drawing Sheets

U.S. PATENT DOCUMENTS

| | | |
|---|---|---|
| 4,825,487 A | 5/1989 | Eberl |
| 5,048,136 A | 9/1991 | Popitz |
| 5,127,120 A | 7/1992 | Mason |
| 5,224,229 A | 7/1993 | Smith |
| 5,228,745 A | 7/1993 | Hazel |
| 5,383,711 A | 1/1995 | Houghteling |
| 5,468,047 A | 11/1995 | Goor et al. |
| 5,518,297 A | 5/1996 | Kassai |
| 5,524,640 A | 6/1996 | Lisak et al. |
| 5,551,109 A | 9/1996 | Tingley et al. |
| 5,556,169 A | 9/1996 | Parrish et al. |
| 5,645,317 A | 7/1997 | Onishi et al. |
| 5,669,665 A | 9/1997 | Nowak |
| 5,735,576 A | 4/1998 | Pepys et al. |
| 5,782,244 A | 7/1998 | Kostich |
| 5,916,089 A | 6/1999 | Ive |
| 5,979,981 A | 11/1999 | Dunne et al. |
| 6,321,403 B1 | 11/2001 | Matthews |
| 6,485,101 B2 | 11/2002 | Kassai et al. |

FOREIGN PATENT DOCUMENTS

| | | |
|---|---|---|
| EP | 0 602 935 | 6/1994 |
| EP | 0 931 694 | 7/1999 |
| JP | 4-44324 | 4/1992 |
| JP | 9-156405 | 6/1997 |

HEAD GUARD STRUCTURE AND HEAD GUARD PAD OF CHILD EQUIPMENT, AND VEHICULAR CHILD SAFETY SEAT

CROSS-REFERENCE TO RELATED APPLICATION

This application is a Continuation of U.S. application Ser. No. 10/110,348 filed on Apr. 10, 2002 now abandoned, which is the U.S. National Phase of PCT International Application PCT/JP01/06558 filed on Jul. 30, 2001. The entire disclosure of the prior application is incorporated herein by reference.

TECHNICAL FIELD

The present invention relates to child equipments for infants of the newborn baby period, the babyhood period, and during the period of a toddler. More particularly, the present invention relates to a structure of a child equipment that can protect the life and brain of an infant.

BACKGROUND ART

The most important feature in a child equipment is the superior capability of safety and comfortableness for the infant. It is particularly critical to protect the life and brain of an infant in the first several months of life whose brain is not yet completely developed.

Although an infant is often thought to be a miniaturized analogy with a grown up, the faculty for life is still immature. There is a possibility that any application of a concept similar to that for a grown up, if taken improperly, may produce harmful aftereffects. For example, consider the case of an external impact applied due to a car accident. Since a baby's head is relatively heavy and the muscle of the neck supporting the head is weak, the head of a baby is more susceptible to impact than other regions of the body.

The skull, the cerebral blood vessel, the cervical spine and the like are not yet mature from the standpoint of structure and function. For example, consider the case of an infant before the age of one year, particularly a baby in the first six months of life. Although a baby of such age carried upright in one's arm may be cradled gently up and down, a strong swing in the back and forth direction or left and right direction may cause cerebral hemorrhage to produce aftereffects or even result in death.

In child equipment such as child seats, baby carriages, baby beds, baby carriers and the like, the provision of a structure that can sufficiently guard the infant's life and brain is an extremely important factor to truly protect an infant taking into consideration the physiological attribute characteristics.

DISCLOSURE OF THE INVENTION

An object of the present invention is to provide a child equipment with a structure that can truly protect an infant, particularly a head guard structure and head guard pad of a child equipment that can guard the life and brain of an infant.

According to an aspect of a head guard structure of a child equipment based on the present invention to achieve the above object, a head guard structure of a child equipment to guard the head of an infant who is placed in a child equipment is provided. The head guard structure includes an impact absorption layer provided so as to sandwich the temporal region of an infant's head from both sides to absorb impact force applied to the temporal region of the infant's head from the transverse direction of the child equipment, and a fixture member to prevent relative position displacement in the lateral direction between the impact absorption layer and the child equipment.

Preferably in the present invention, the fixture member is located at the lateral outer side of the impact absorption layer, and is formed of a material harder than that of the impact absorption layer. Also preferably, the fixture member is provided so as to enclose the head of an infant from the temporal region to the head top region.

Preferably, the impact absorption layer is provided so as to enclose the head of the infant from the temporal region to the head top region.

According to another aspect of a head guard structure of a child equipment based on the present invention, the head guard structure of a child equipment to guard the head of an infant placed in the child equipment includes an impact absorption layer provided at the head top side of an infant to absorb impact force applied to the top of the head of the infant from a vertical direction of the child equipment, and a fixture member to prevent relative position displacement in the vertical direction between the impact absorption layer and the child equipment.

Preferably in the above invention, the fixture member is located at the vertical outer side of the impact absorption layer, and is formed of a material harder than that of the impact absorption layer. Preferably, the fixture member has a configuration that fills the gap from the child equipment. Also preferably, the fixture member has a configuration that fills the gap at the corner of the child equipment. Also preferably, the height of the fixture member is lower than the height of the impact absorption layer. Also preferably, the impact absorption layer and the fixture member have a cover thereon so as to form an integral piece. Also preferably, a flexible pad layer is provided at the inner side of the impact absorption layer. Also preferably, the impact absorption layer, the fixture member, and the flexible pad layer have a cover thereon so as to form an integral piece.

Also preferably, a protruding region protruding inwards is provided at a region about the upper portion of the impact absorption layer. Also preferably, the upper portion of the impact absorption layer is provided so as to protrude above the upper portion of the sidewall provided at the child equipment. Even in the case where external force is applied on the head region of an infant so as to bounce upwards from the receiving concave, the above-described structure can reliably prevent the head region of the infant from bouncing outwards since the head region of the infant will abut against the protruding region.

According to an aspect of a head guard pad of the present invention, the head guard pad to guard the head of an infant placed in a child equipment includes an impact absorption layer provided so as to enclose the head of an infant from the temporal region to the head top region to absorb impact force applied to the head of the infant, and a fixture member disposed at the outer side of the impact absorption layer, having a configuration that fills the gap from the child equipment.

According to another aspect of a head guard pad of the present invention, the head guard pad to guard the head of an infant placed in a child equipment includes an impact absorption layer provided at the head top side of the infant to absorb impact force applied to the head of the infant, and a fixture member disposed at the outer side of the impact absorption layer, having a configuration that fills the gap from the child equipment.

Preferably in the above-described invention, a flexible pad is provided at the inner side of the impact absorption layer.

Also preferably, the flexible pad is provided so as to enclose the head region of the infant above the area of the nose of the infant. By such a structure, any discomfort when an infant turns his/her head sideways can be eliminated.

Preferably in the above-described invention, a protruding region that protrudes inwards is provided in the region about the upper portion of the impact absorption layer. Even in the case where external force is applied to the head region of an infant so as to bounce out upwards from the receiving concave, such a structure can reliably prevent the head region of the infant from bouncing out since the head region of the input abuts against the protruding region.

According to the head guard structure and head guard pad of the child equipment of the present invention, a structure is employed in which the fixture pad is configured so that the outer circumferential plane is in accord with the inner circumferential plane of the sidewall and the inner circumferential plane of the fixture pad is in accord with the head of the infant so as to fill the gap from the child equipment. Furthermore, an impact absorption layer and a flexible pad are provided at the inner circumferential plane. Therefore, even in the case where external force is applied horizontally and vertically to the child equipment, the infant's head will not receive impact since the head is enclosed by the impact absorption layer and flexible pad.

The impact absorption layer and flexible pad will not move horizontally or vertically by virtue of the fixture pad. Also, since the outer circumferential plane of the fixture member has a configuration in accord with the inner circumferential plane of the child equipment, the fixture member will not move even in the case where external force is applied obliquely. The impact absorption layer and flexible pad will not move horizontally, and the infant's head will not bounce up. As a result, the infant's head can be protected securely. The life and brain of an infant can be guarded without injuries to the skull, the cerebral blood vessel, the cervical spine, and the like.

By setting the height of the fixture member lower than the height of the impact absorption layer, the oppressive feeling from the fixture member can be eliminated. Furthermore, the appearance will become aesthetically more acceptable.

Any usage mode can be accommodated by employing a structure in which the flexible pad, the impact absorption layer and the fixture member are coupled to result in an integral piece structure, or have the same cover provided thereon to result in an integral piece structure, or a structure in which the flexible pad is provided in a detachable manner so that only the flexible pad can be removed, or a divisible structure in which the flexible pad, the impact absorption layer and the fixture member are detachable with respect to each other.

According to an aspect of a vehicular child safety seat of the present invention, the vehicular child safety seat is fixed to the seat of a vehicle, and includes a seat unit and a base unit supporting the seat unit. The vehicular child safety seat includes head guard means provided at the seat unit to guard the head of an infant placed in the vehicular child safety seat, and a position displacement inhibit means provided between the bottom plane of the base unit and the seat of the vehicle to inhibit position displacement of the vehicular child safety seat relative to the seat of the vehicle. Also, the head guard means includes an impact absorption layer provided to enclose the head of an infant from the temporal region to the head top region to absorb impact applied to the head of the infant, and a fixture member disposed at the other side of the impact absorption layer, and having a configuration that fills the gap from the seat.

In a preferable embodiment of the present invention, the position displacement inhibit means includes a position displacement inhibit member provided to cover at least the bottom plane of the base unit. The position inhibit member is formed of a material whose friction coefficient between the position displacement inhibit member and the seat of the vehicle is greater than the friction coefficient between the member forming the bottom plane of the base unit and the seat of the vehicle.

According to a still further aspect of a vehicular child safety seat of the present invention, the vehicular child safety seat fixed to a seat of a vehicle includes a seat unit, a base unit supporting the seat unit, an impact absorption member enclosing the head of an infant placed on the vehicular child safety seat from the temporal region of the head to the head top region to absorb impact force applied to the head of the infant, and a position displacement inhibit means provided between the bottom plane of the base unit and the seat of the vehicle to inhibit position displacement of the vehicular child safety seat in relation to the seat of the vehicle. As a preferable embodiment of the above-described invention, a guard pad is provided at the inner side of the impact absorption member.

According to an aspect of a vehicular child safety seat of the present invention, no impact, even in the case where an external force is applied to the vehicular child safety seat in the horizontal direction and the vertical direction, will be applied since the head of the infant is enclosed by the impact absorption layer and fixture member. By providing a position displacement inhibit means for preventing position displacement of the vehicular child safety seat in relation to the seat of the vehicle, the impact to the infant's head caused by the shift of the vehicular child safety seat per se can be avoided simultaneously.

Since the impact absorption layer and fixture member will not be shifted, the impact absorption layer and fixture member will not move sideways, and the infant's head will not bounce up. As a result, the infant's head can be securely protected. The life and brain of an infant can be protected without injuries to the skull, cerebral blood vessel, cervical spine, and the like. The above-described structure exhibits significant advantage when the vehicular child safety seat is used in a bed position.

According to yet a further aspect of a vehicular child safety seat of the present invention, the vehicular child safety seat fixed to a seat of a vehicle includes a position displacement inhibit means provided between the bottom plane of the base unit and the seat of the vehicle for inhibiting position displacement of the vehicular child safety seat in relation to the seat of the vehicle.

Preferably in the above-described invention, the position displacement inhibit means includes a plane portion located all over between the bottom plane of the base unit and the seat of the vehicle, having a friction coefficient greater than the friction coefficient between the member forming the bottom plane of the base unit and the seat of the vehicle, and a side plane portion that stands upright from the edge of the plane portion so as to surround the outer circumferential plane of the base unit.

By providing a position displacement inhibit means of this vehicular child safety seat, application of an impact to an infant's head caused by a movement of the vehicular child safety seat can be avoided. The bouncing of the infant's head can be prevented. As a result, the infant's head can be guarded securely. The life and brain of an infant can be protected without injuries to the skull, cerebral blood vessel, cervical spine, and the like.

BEST MODES FOR CARRYING OUT THE INVENTION

A head guard structure and head guard pad of a child equipment to truly protect an infant, particularly a head guard structure and head guard pad of respective child equipments according to the present invention that can guard the life and brain of an infant will be described hereinafter with reference to the drawings. In practice, a safety belt (two-point harness type, three-point harness type) to fasten an infant to the child equipment is provided in the child equipment. However, illustration thereof is not provided here since it does not affect the substance of the present invention.

First Embodiment

Figure 1:
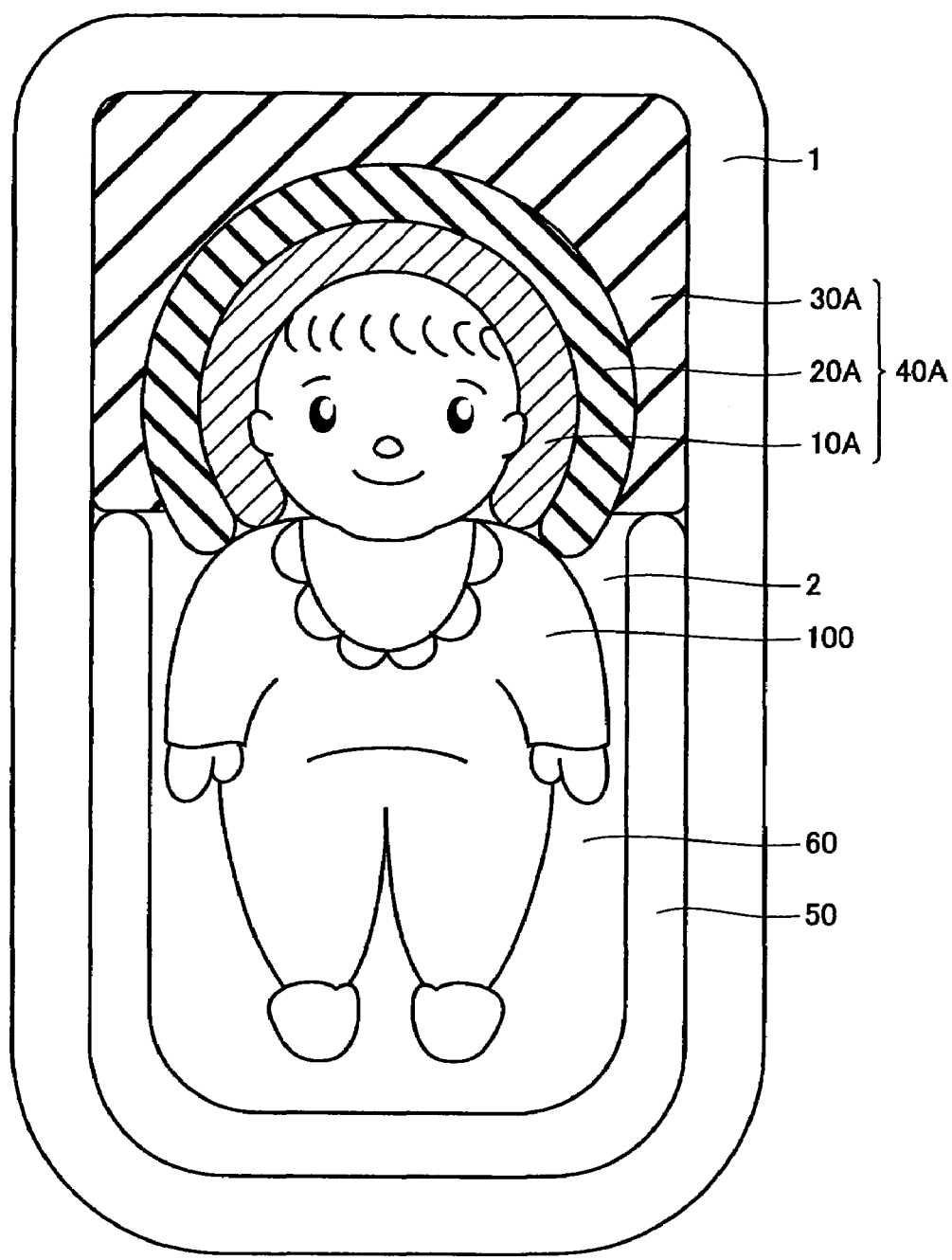
FIG. 1 is a plan view of a child equipment according to a first embodiment.
Figure 2:
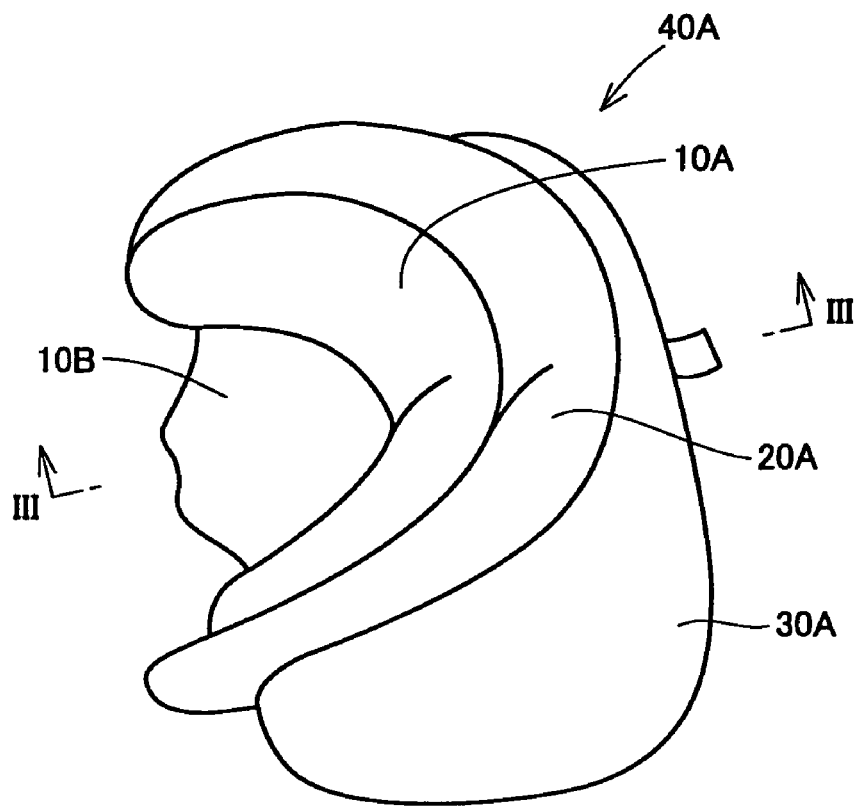
FIG. 2 is a perspective view of the entirety of a head guard pad 40A of the first embodiment.
Figure 3:
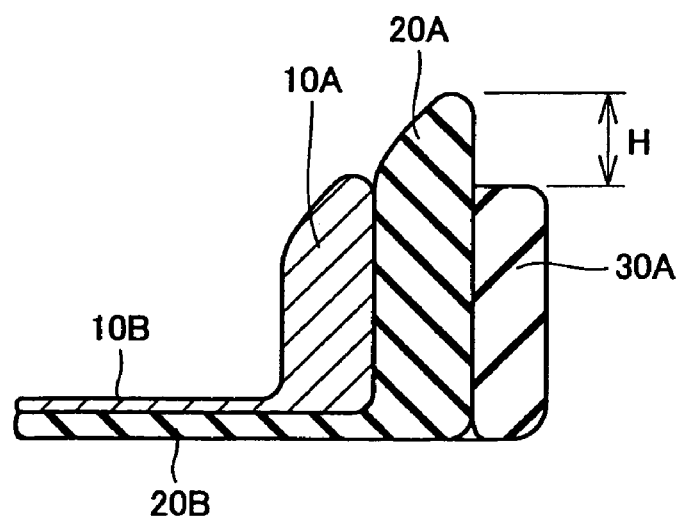
FIG. 3 is a sectional view taken in the direction of the arrow of line III-III in FIG. 2.

A head guard structure and head guard pad of a child equipment according to the present invention will be described with reference to FIGS. 1-3. FIG. 1 is a plan view of a child equipment. FIG. 2 is a perspective view of the entirety of a head guard pad 40A that will be described afterwards. FIG. 3 is a sectional view taken in the direction of the arrow of line III-III in FIG. 2.

The child equipment of the present invention includes a receiving concave 60 for receiving a baby 100. This receiving concave includes a main unit 2 protecting baby 100 from the backside, and a sidewall 1 protecting the side region of baby 100. Baby 100 has his/her head protected by head guard pad 40A and his/her body protected by a body pad 50 at the inner region of receiving concave 60.

[Head Guard Pad 40A]

As shown in FIGS. 1 and 2, head guard pad 40A includes a flexible pad 10A directly in contact with the head of baby 100, enclosing the head top region of baby 100, provided to sandwich the temporal region from both sides, an impact absorption pad 20A functioning as an impact absorption layer at the outer side of flexible pad 10A, covering the head top of baby 100 likewise as flexible pad 10A, and sandwiching the temporal region of the head from both sides, and a fixture pad 30A whose outer circumferential plane is in accord with the inner circumferential plane of sidewall 1 so as to fill the gap between impact absorption pad 20A and sidewall 1, functioning as a fixture member to inhibit relative position displacement in the horizontal direction and the vertical direction between impact absorption pad 20A and sidewall 1. Flexible pad 10A and impact absorption pad 20A are provided with head occiput pads 10B and 20B, respectively, to protect the occipital region of the head of baby 100.

Since flexible pad 10A is brought into direct contact with the head of baby 100, a soft-feeling material such as a sponge member, cotton, and the like is preferable. In order to absorb impact applied to the head of infant 100 caused by the shaking of the child equipment, impact absorption pad 20A preferably employs a member that is effective to absorb impact such as urethane, a foam material and the like. In order to prevent the head of infant 100 from flopping, particularly to prevent left and right swinging, fixture pad 30A preferably employs a material that exhibits only a small change in volume in response to the application of an external force while having an impact absorption effect such as polystyrene foam and the like of a relatively hard material, in addition to the provision of impact absorption pad 20A. Impact absorption pad 20A and fixture pad 30A may be formed of the same member.

In order to prevent displacement among flexible pad 10A, impact absorption pad 20A and fixture pad 30A, it is preferable to provide a coupling member therebetween. Furthermore, in order to prevent relative position displacement between fixture pad 30A and the child equipment, it is preferable to provide a coupling member therebetween.

[Function•Advantage]

By employing a structure in which fixture pad 30A is configured so that the outer circumferential plane is in accord with the inner circumferential plane of sidewall and the inner circumferential plane is in accord with the head of baby 100, and impact of absorption pad 20A and flexible pad 10A are provided at the inner side, no impact will be applied to baby 100, even when a horizontal or vertical external force is applied to the child equipment, since the head of baby 100 is enclosed by impact absorption pad 20A and flexible pad 10A.

Impact absorption pad 20A and flexible pad 10A are supported against horizontal and vertical movement by fixture pad 30A. Even in the case where external force is applied from an oblique direction, fixture pad 30A will not be displaced since the outer circumferential plane of fixture pad 30A has a configuration in accord with the inner circumferential plane of sidewall 1. Thus, impact absorption pad 20A and flexible pad 10A is supported against a lateral movement, and the head of baby 100 will not bounce. As a result, the head of baby 100 can be guarded securely. The life and brain of an infant can be protected without injuries to the skull, the cerebral blood vessel cervical spine and the like.

As shown by the sectional structure of FIG. 3, the height of fixture pad 30A from main unit 2 is set lower than the height of impact absorption pad 20A from main unit 2 (H is the difference in height therebetween). Therefore, the oppressive feeling from fixture pad 30A is eliminated. Also, an aesthetically more acceptable appearance can be provided.

Figure 4:
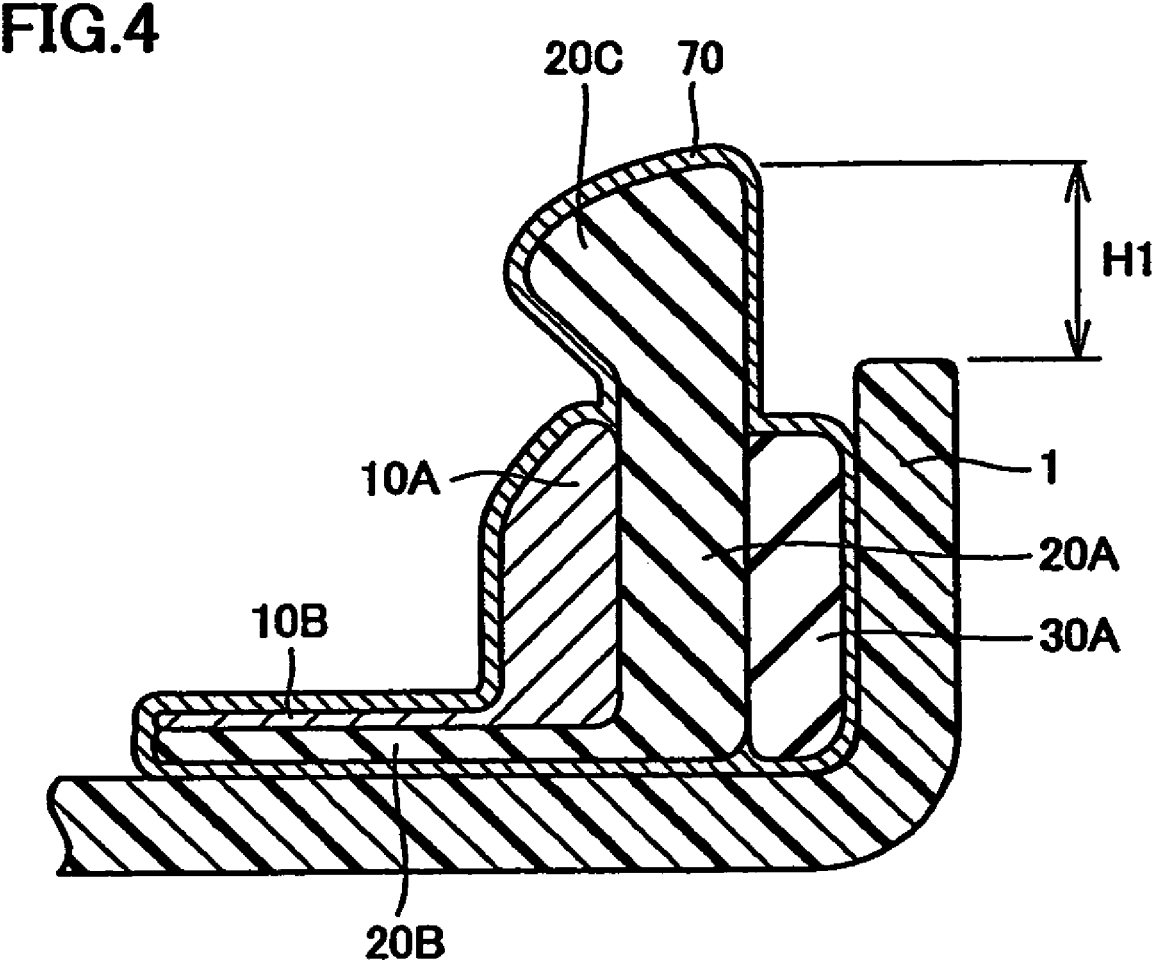
FIG. 4 is a sectional view of a structure of another mode corresponding to the sectional view taken in the direction of the arrow of line III-III in FIG. 2.

As shown in the sectional structure of FIG. 4, impact absorption pad 20A includes a protruding region 20C that protrudes inwards about the upper portion of impact absorption pad 20A. Specifically, the thickness of impact absorption pad 20A is greater at the upper area portion than at the other sidewall portion. As shown in FIG. 4, the protruding region or portion 20C protrudes inwardly over, but not inwardly beyond, an upper edge of the flexible pad 10A. Such a provision of protruding region 20C can reliably prevent the head region of an infant from bouncing out even when an external force is applied that causes the head region of the infant to bounce upwards from the receiving concave since the head region of the infant will abut against protruding region 20C.

From the standpoint of obtaining the space that supports the head of an infant as well as more reliably preventing the bounce of the head, it is preferable that the top of impact absorption pad 20A is provided to protrude higher than or above the top of sidewall 1 of the child equipment (distance H1), as shown in FIG. 4. The reason thereof is set forth below. In the case where a child seat, a baby carriage, a baby bed, a baby carrier or the like is applied as the child equipment, particularly when used in a seat position, it is preferable that the height of sidewall 1 is lower from the standpoint of ensuring the view of the infant because head guard pad 40A will not be used since the body size of the infant is big enough. However, when used in a bed position, the necessity of ensuring the view of the infant is low since the user who requires the usage of head guard pad 40A is generally a newborn baby or a baby during the first few months of life. Therefore, it is preferable from the standpoint of safety that the height of impact absorption pad 20A is higher than sidewall 1.

Although an integral structure may be employed in which flexible pad 1OA, impact absorption pad 20A and fixture pad 30A are coupled to each other or enclosed by the same one cover 70 as shown in FIG. 4, a structure in which flexible pad 10A is provided in a detachable manner can also be employed so that flexible pad 10A can be removed when the infant has come to an older age. Also, a divisible structure can be employed in which flexible pad 10A, impact absorption pad 20A and fixture pad 30A are respectively detachable with each other.

In the present embodiment, impact absorption pad 20A and fixture pad 30A are configured so as to enclose the head of baby 100 at the head top and the temporal region. In the case where only the side swing of the head of baby 100 is of concern, impact absorption pad 20A and fixture pad 30A may be configured so as to sandwich the temporal region of baby 100.

Figure 5:
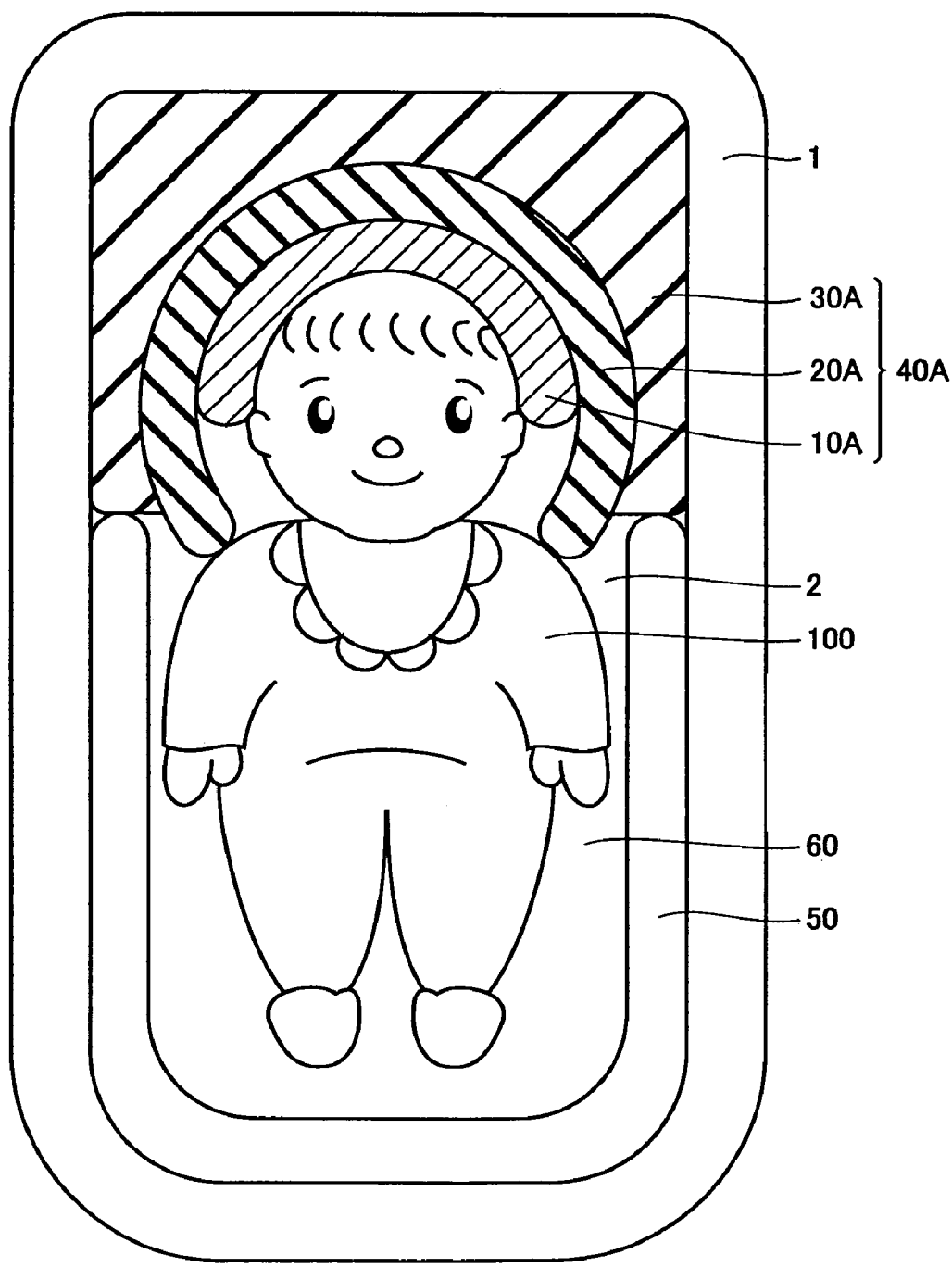
FIG. 5 is a plan view of a child equipment according to another mode of the first embodiment.

In the case where flexible pad 10A is provided extending from the head to the shoulder of baby 100 as shown in FIG. 1, flexible pad 10A may come into contact with the nose and mouth of baby 100 when baby 100 turns his/her head sideways, resulting in discomfort in the breathing of infant 100. In view of such a case, flexible pad 10A can be formed so that the lower portion extends only from the position corresponding to the nose of baby 100 to enclose only the head region at the area above the nose, as shown in FIG. 5. Accordingly, the discomfort when baby 100 turns his/her head sideways can be eliminated.

Second Embodiment

Figure 6:
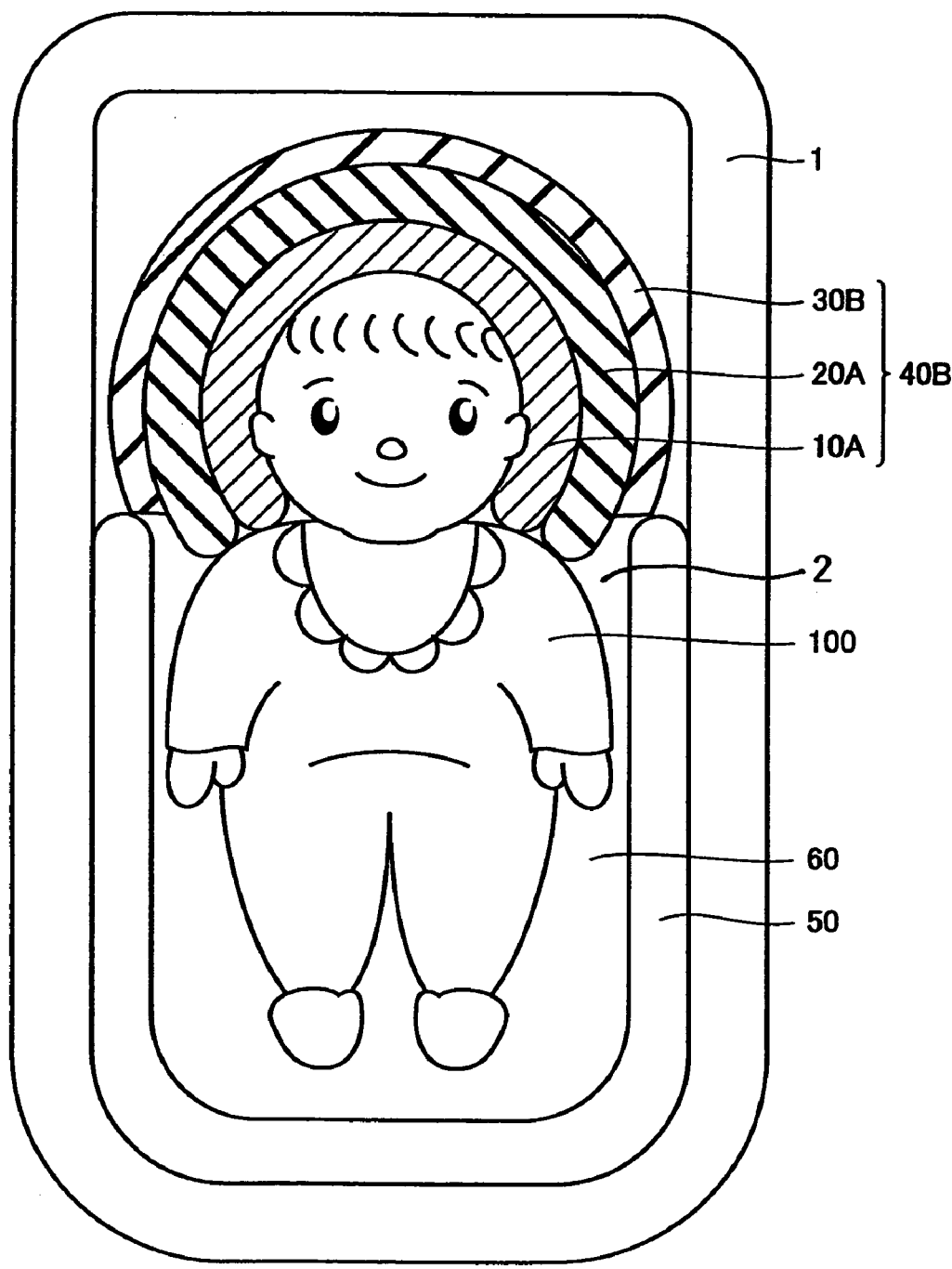
FIG. 6 is a plan view of a child equipment according to a second embodiment.
Figure 7:
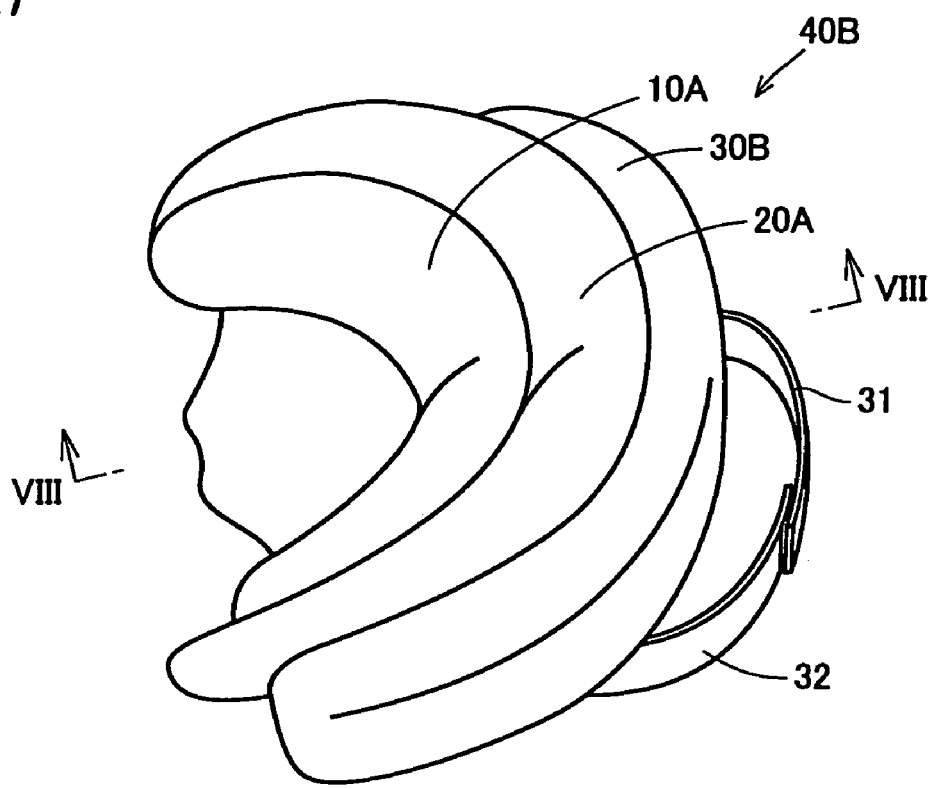
FIG. 7 is a perspective view of the entirety of a head guard pad 40B of the second embodiment.
Figure 8:
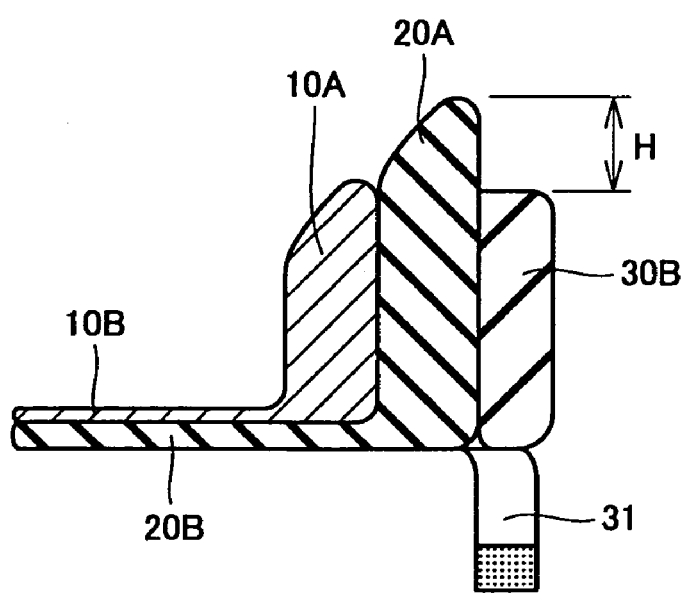
FIG. 8 is a sectional view taken in the direction of the arrow of line VIII-VIII in FIG. 7.

A head guard structure and the head guard pad of a child equipment according to a second embodiment will be described with reference to FIGS. 6-8. The structure is basically similar to the structure of the above-described first embodiment. Therefore, only the difference will be described. FIG. 6 is a plan view of the child equipment. FIG. 7 is a perspective view of the entirety of a head guard pad 40B that will be described afterwards. FIG. 8 is a sectional view taken in the direction of the arrow of line VIII-VIII of FIG. 7.

According to the head guard structure and head guard pad of a child equipment of the present embodiment, fixture pad 30B is configured to enclose the head top and temporal region of the head of baby 100 similar to flexible pad 10A and impact absorption pad 20A, instead of the configuration in which the outer circumferential plane of fixture pad 30A is in accord with the inner circumferential plane of sidewall 1. Fixture pad 30B can be fastened to main unit 2.

In the above-described first embodiment, the outer circumferential plane of fixture pad 30A is set along the inner circumferential plane of sidewall 1 in order to prevent the sideway swing of flexible pad 10A and impact absorption pad 20A. The structure of fastening fixture pad 30B to main unit 2 can also prevent the lateral swing of flexible pad 10A and impact absorption pad 20A. Specifically, fixture belts 31 and 32 detachable with respect to each other are provided at the bottom plane of fixture pad 30B. Fixture belts 31 and 32 are passed through a hole for fixture (not shown) provided in main unit 2 to be joined together. Other well known techniques can be applied as to the structure of fastening fixture pad 30B to main unit 2.

The position where fixture belts 31 and 32 is provided is not limited to the one position at the center region of head guard pad 40B (the state shown in FIG. 6). From the standpoint of preventing rotation of head guard pad 40B, the belts can be provided at each of the left and right regions (total of two sites) of head guard pad 40B. As to the attachment of fixture belts 31 and 32 to the child equipment, a hole provided only for the purpose of attachment in the main unit can be used instead of using the already-existing shoulder belt hole.

[Function•Advantage]

The function and advantage similar to those of the previous first embodiment can be obtained by employing such a structure of fixing fixture pad 30B to main unit 2.

As shown by the sectional structure of FIG. 8, the height of fixture pad 30B from main unit 2 is set lower than the height of impact absorption pad 20A from main unit 2 (difference in height H). Likewise as the first embodiment, the oppressive feeling given from fixture pad 30B can be eliminated. Also, it can give an aesthetically more agreeable appearance. As to the configuration of the upper portion of impact absorption pad 20A and the height of impact absorption pad 20A with respect to sidewall 1 of the child equipment, a structure similar to that of the previous first embodiment described with reference to FIG. 4 can be employed. Also, as to the position of the lower portion of flexible pad 10A, a structure similar to that of the previous first embodiment described with reference to FIG. 5 can be employed.

Furthermore, although an integral structure in which flexible pad 10A, impact absorption pad 20A and fixture pad 30B are coupled respectively or enclosed by the same one cover may be employed similar to the first embodiment, a structure in which flexible pad 10A is provided in a detachable manner may be employed so that flexible pad 10A can be removed when the baby has grown. Also, a divisible structure in which flexible pad 10A, impact absorption pad 20A and fixture pad 30B are detachable with respect to each other can be employed.

In the present embodiment, impact absorption pad 20A and fixture pad 30B are configured so as to cover the head top and temporal region of the head of baby 100. In the case where only the lateral movement of the head of baby 100 is of concern, impact absorption pad 20A and fixture pad 30B may be configured so as to sandwich the temporal region of baby 100.

Third Embodiment

Figure 9:
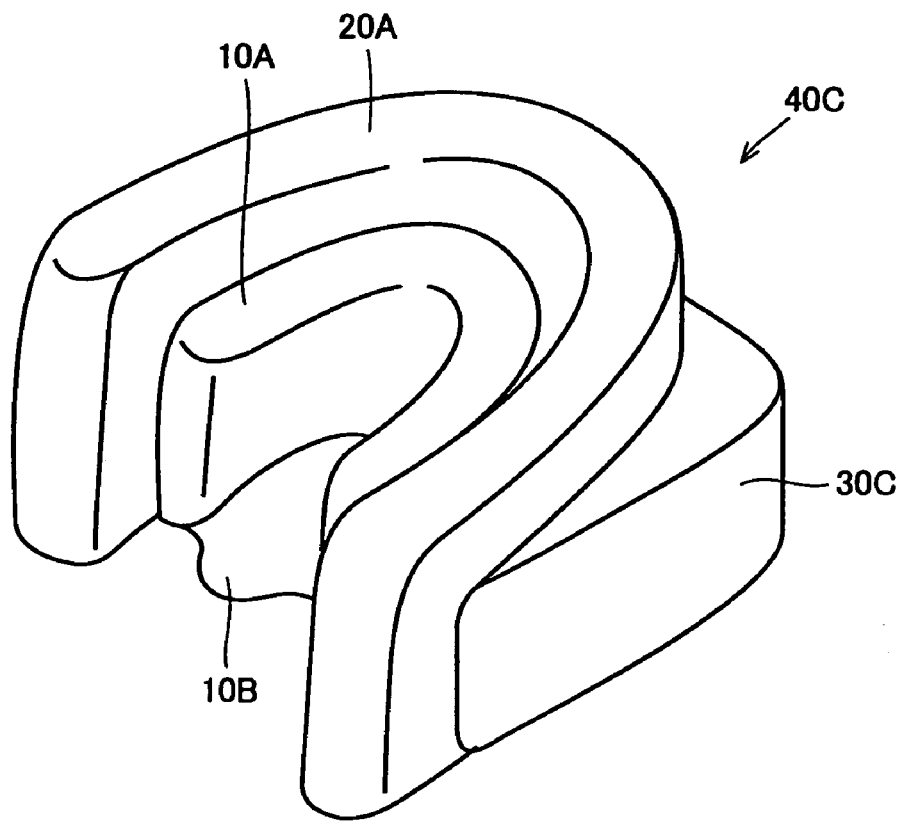
FIG. 9 is a perspective view of a head guard pad 40C according to a third embodiment.
Figure 10:
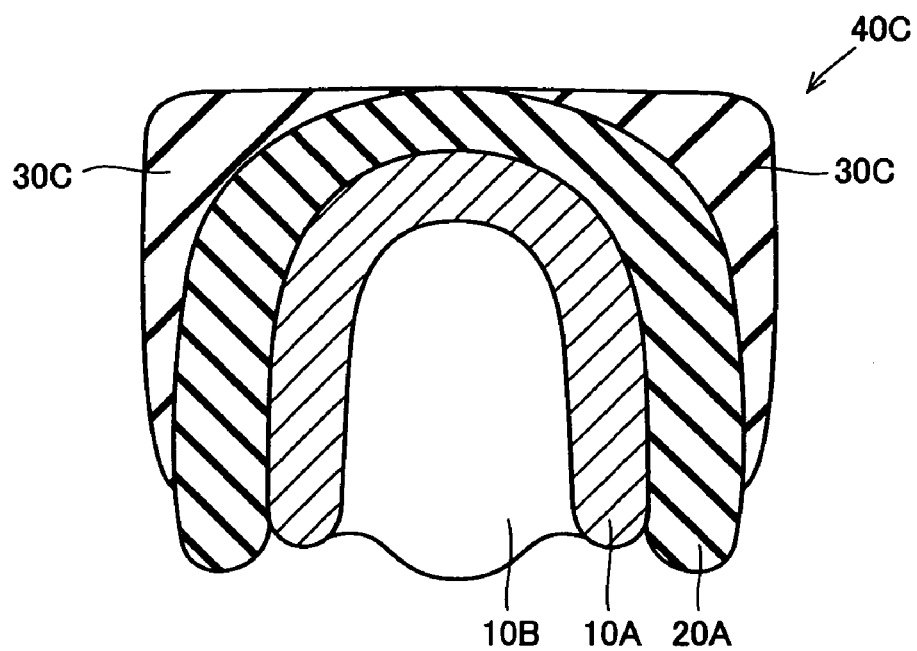
FIG. 10 is a plan view of head guard pad 40C of the third embodiment.

A head guard structure and head guard pad of a child equipment according to a third embodiment will be described with reference to FIGS. 9 and 10. Since the structure is basically similar to the structure of the previous first and second embodiments, only the difference will be described. FIG. 9 is a perspective view of a head guard pad 40C that will be described afterwards. FIG. 10 is a plan view of head guard pad 40C.

Head guard pad 40C of the present embodiment is configured to fill the gap present at the corner region of the child equipment.

[Function•Advantage]

The function and advantage similar to those of the previous first and second embodiments can be obtained even in the case where head guard pad 40C having the configuration of the above fixture pad 30C is employed.

Similar to the first and second embodiments, although an integral structure in which flexible pad 10A, impact absorption pad 20A and fixture pad 30C are respectively coupled or enclosed by the same one cover can be employed, a structure in which flexible pad 10A is provided in a detachable manner may be employed so that flexible pad 10A can be removed when the baby has grown. Also, a divisible structure in which flexible pad 10A, impact absorption pad 20A and fixture pad 30C are detachable with respect to each other can by employed.

Fourth Embodiment

Figure 11:
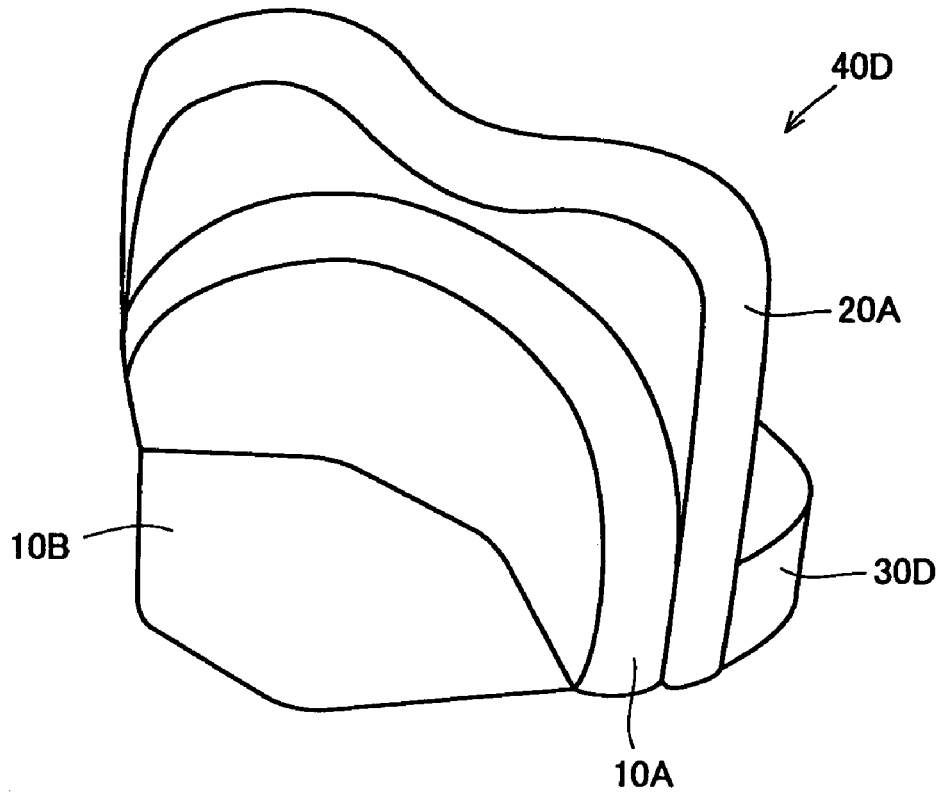
FIG. 11 is a perspective view of a head guard pad 40D according to a fourth embodiment.
Figure 12:
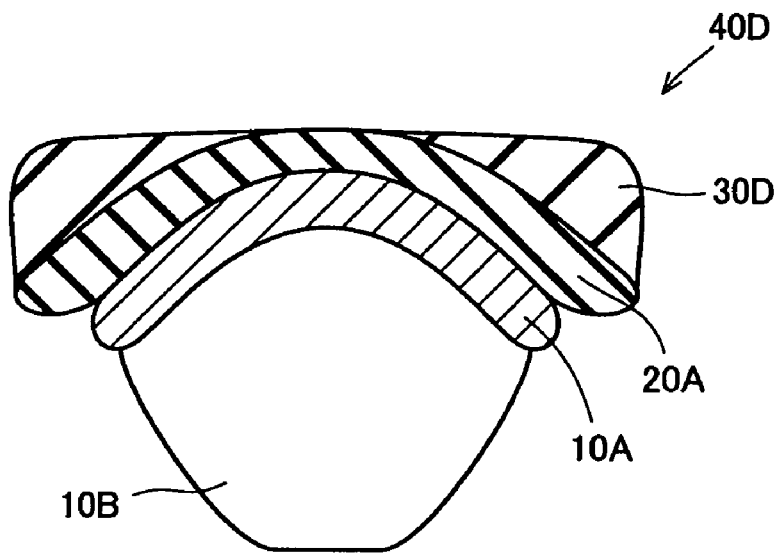
FIG. 12 is a plan view of head guard pad 40D of the fourth embodiment.

A head guard structure of a child equipment and a structure of a head guard pad according to a fourth embodiment will be described with reference to FIGS. 11 and 12. Since the structure is basically similar to that of the above first to third embodiments, only the difference will be described. FIG. 11 is a perspective view of a head guard pad 40D that will be described afterwards. FIG. 12 is a plan view of head guard pad 40D.

Head guard pad 40D of the present embodiment is directed to guarding the head top of a baby, employed in the case where the temporal region of the head of a baby is protected sufficiently by a temporal region guard member provided in the child equipment. Impact absorption pad 20A is arranged at the head top side of the baby so as to protect the head top of the baby. Also, a fixture pad 30D to fill the gap from the child equipment is configured to fill only the gap at the corner of the child equipment.

[Function•Advantage]

Use of head guard pad 40D of the above-described configuration provides the advantage that no impact will be applied to the head top portion of the head of baby 100, even when an external force in the vertical direction is applied to the child equipment since flexible pad 10A and impact absorption pad 20A are provided at the head top portion of baby 100. Impact absorption pad 20A and flexible pad 10A are supported against the horizontal and vertical movements by fixture pad 30D. Even in the case where external force is applied obliquely, head guard pad 40D will not be displaced by virtue of fixture pad 30D. Thus, impact absorption pad 20A and flexible pad 10A will not be displaced laterally and vertically. The head of baby 100 will not bounce up. As a result, the head of a baby 100 can be guarded securely. The life and the brain of an infant can be protected without injuries to the skull, cerebral blood vessel, cervical spine, and the like.

Likewise the first to third embodiments, although an integral structure in which flexible pad 10A, impact absorption pad 20A and fixture pad 30D are coupled to each other or enclosed by the same one cover may be employed, a structure in which flexible pad 10A is provided in a detachable manner may be employed so that flexible pad 100A can be removed when the baby has grown. Also, a divisible structure in which flexible pad 10A, impact absorption pad 20A and fixture pad 30D are detachable with respect to each other can be employed.

Fifth Embodiment

Figure 13:
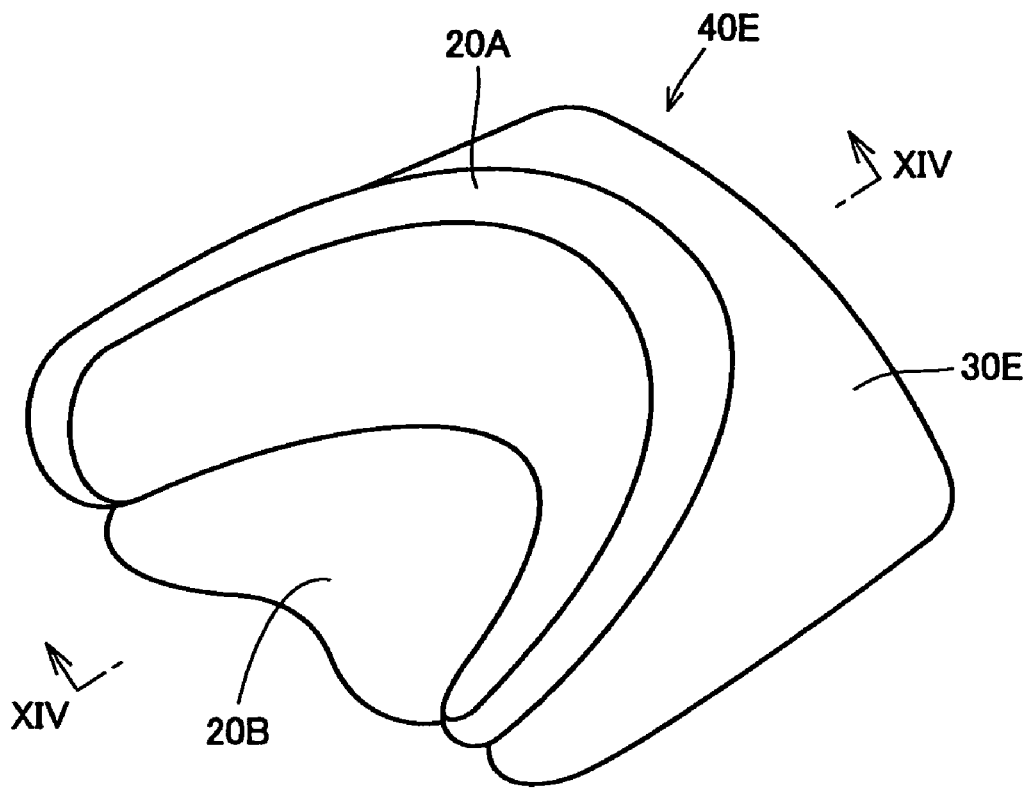
FIG. 13 is a perspective view of a head guard pad 40E according to a fifth embodiment.
Figure 14:
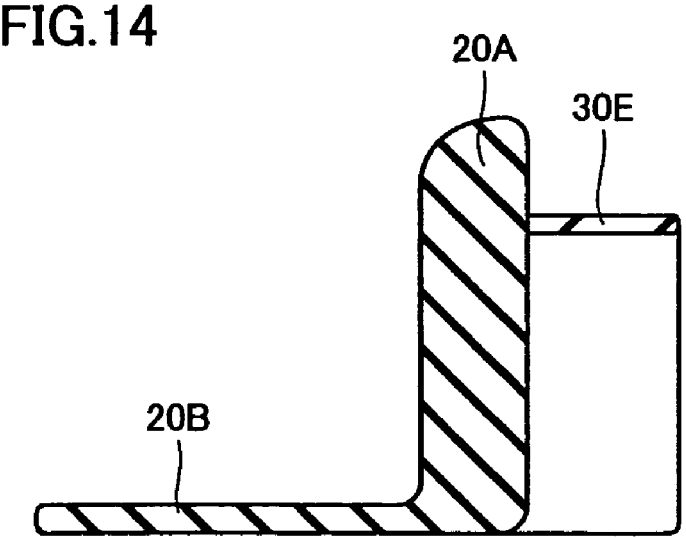
FIG. 14 is a sectional view taken in the direction of the arrow of line XIV-XIV in FIG. 13.

A head guard structure of a child equipment and the structure of a head guard pad according to a fifth embodiment will be described with reference to FIGS. 13 and 14. Since the structure is basically similar to the structure of the above first to fourth embodiments, only the difference will be described. FIG. 13 is a perspective view of a head guard pad 40E that will be described afterwards. FIG. 14 is a sectional view taken in the direction of the arrow of line XIV-XIV in FIG. 13.

The fixture pad provided in the head guard pad of each of the above-described embodiments is suitable in the case where a relatively large impact is applied to the child equipment. For example, it is contemplated that a child seat used in a car is taken as the child equipment in the above embodiments. However, in the case of a baby carrier or the like used indoors, it is assumed that an impact force as strong as that which may be applied to a child seat will not arise. In this case, a hollow fixture pad 30E as shown in FIGS. 13 and 14 can be employed as the fixture pad. This fixture pad 30E has a profile configuration similar to that of the first embodiment.

[Function•Advantage]

The function and advantage similar to those of the first embodiment can be obtained by the usage of head guard pad 40E of the above configuration. Although flexible pad 10A is not shown in FIGS. 13 and 14, flexible pad 10A can be employed similar to each of the above embodiments. Although an integral structure in which flexible pad 10A, impact absorption pad 20A and fixture pad 30E are coupled to each other or enclosed by the same one cover can be employed, a structure in which flexible pad 10A is provided in a detachable manner may be employed so that flexible pad 10A is removed when the baby has grown. Also, a divisible structure in which flexible pad 10A, impact absorption pad 20A and fixture pad 30E are detachable with respect to each other can be employed.

In each of the above embodiments, a mechanism can be employed in which the attaching position of the head guard pad with respect to the child equipment can be altered according to the development of the body height of the baby. Also, a structure of the head guard pad per se that is extendible with respect to the direction of the body height of the baby can be applied.

In each of the above embodiments, description is provided in which the child equipment has a bed position, and an infant is laid down therein. A similar function and advantage can be achieved even when the child equipment takes a seat position.

The child equipment of each of the above embodiments is also applicable to a child seat, a baby carriage, a baby bed, a baby carrier and the like.

Sixth Embodiment

Figure 15:
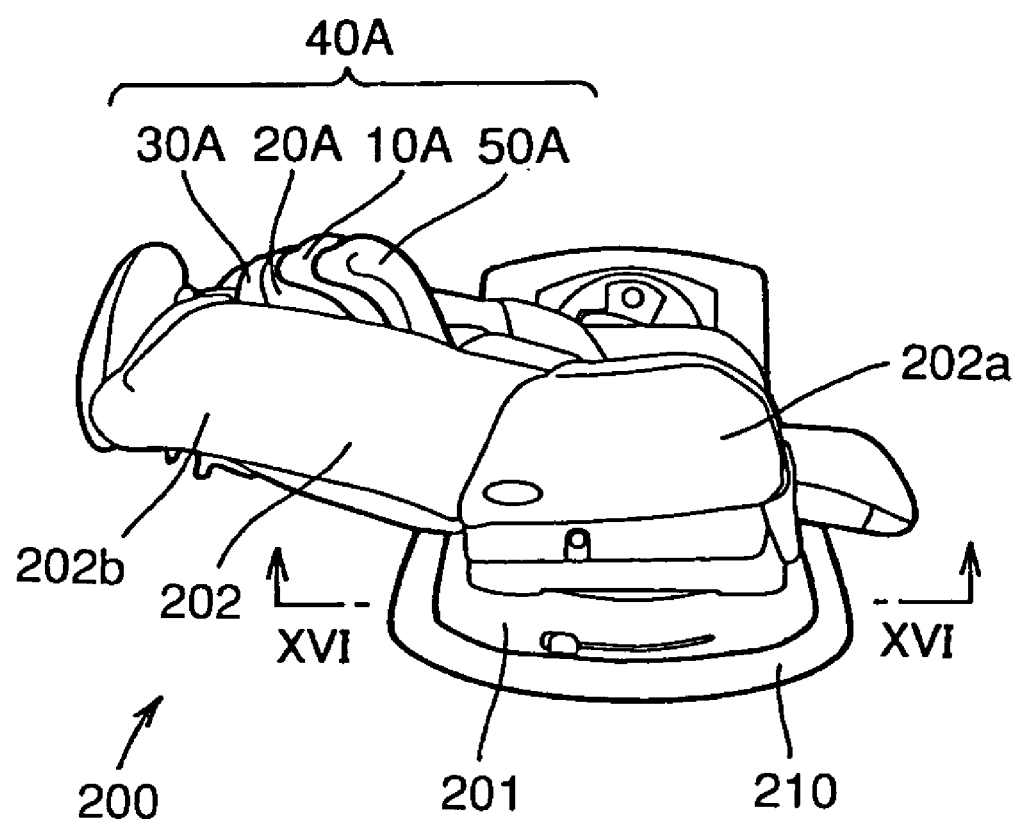
FIG. 15 is a diagram of the entirety of a child seat 200 according to a sixth embodiment in a first usage state.
Figure 16:
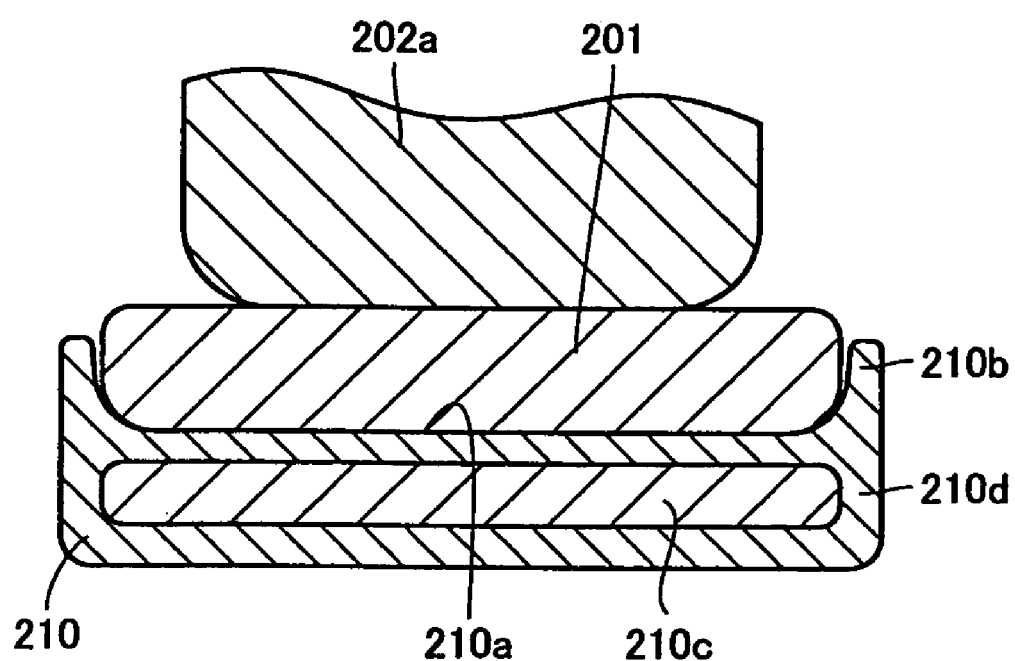
FIG. 16 is a sectional view taken in the direction of the arrow of line XVI-XVI in FIG. 15.
Figure 17:
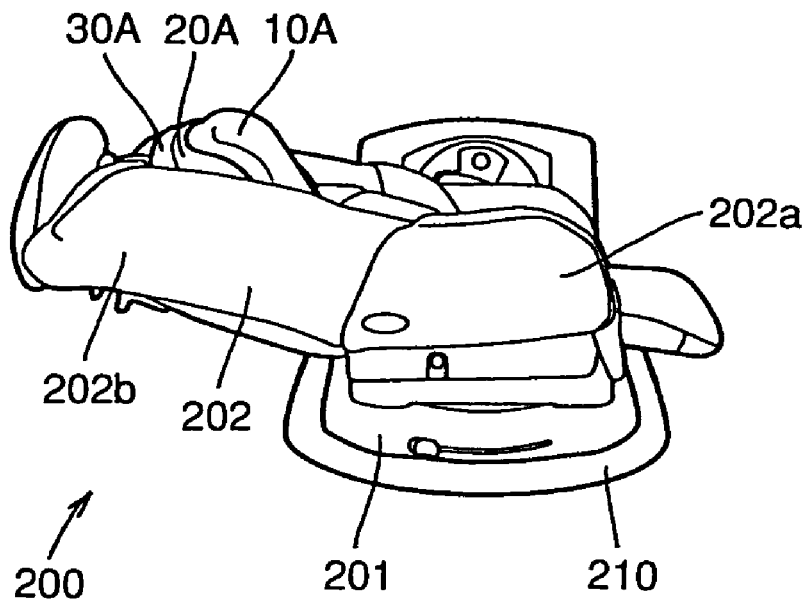
FIG. 17 is a diagram of the entirety of child seat 200 of the sixth embodiment in a second usage state.
Figure 18:
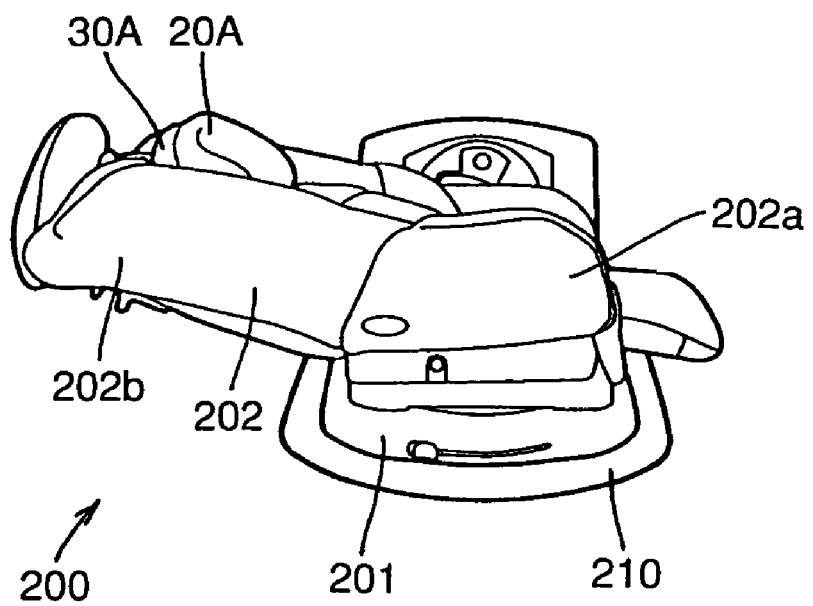
FIG. 18 is a diagram of the entirety of child seat 200 of the sixth embodiment in a third usage state.

Referring to FIGS. 15-18, a child equipment according to a sixth embodiment of the child equipment of the present embodiment has a head guard structure applied to a child seat which is a vehicular child safety seat as an example of the child equipment. FIG. 15 shows the entirety of a child seat 200 in a first usage state. FIG. 16 is a sectional view taken in the direction of the arrow of line XVI-XVI in FIG. 15. FIGS. 17 and 18 show the entirety of child seat 200 in a second usage state and third usage state, respectively.

Referring to FIG. 15, child seat 200 includes a base unit 201, and a seat unit 202 supported rotatably with respect to base unit 201. Seat unit 202 includes a seat bottom 202*a* and a backrest 202*b*. Backrest 202*b* is provided in a reclining manner with respect to seat bottom 202*a*. The illustrated state corresponds to the state where backrest 202*b* is most reclined, providing a bed position for child seat 200. When backrest 202*b* is at the most upright position, child seat 200 provides a seat position (not shown).

On the part of backrest 202*b* of seat unit 202, head guard pad 40A described in the first embodiment is provided to guard the head region of an infant from impact. At the inner side of head guard pad 40A, flexible pad 50A provided to cover the head top of the infant and sandwiching the temporal region of the head from both sides is provided, forming direct contact with the infant's head. Similar to the first embodiment, head guard pad 40A including flexible pad 50A are provided with flexible pad 10A provided to cover the head top of the infant and sandwiching the temporal region from both sides, impact absorption pad 20A as an impact absorption layer at the outer side of flexible pad 10A, covering the head top of the baby and sandwiching the temporal region from both sides, similar to flexible pad 10A, and fixture pad 30A having an outer circumferential plane in accord with the inner circumferential plane of backrest 202*b* so as to fill the gap between impact absorption pad 20A and backrest 202*b*, functioning as a fixture member to inhibit relative position displacement between impact absorption pad 20A and backrest 202*b* in the horizontal direction and vertical direction. The remaining basic structure is similar to that of the above-described head guard pad 40A.

As shown in FIG. 16, a position displacement inhibit member 210 functioning as a position displacement inhibit means for preventing position displacement between the bottom plane of base 201 and the seat of the vehicle is provided so as to cover the bottom plane of a base unit 201 in the present embodiment.

This position displacement inhibit member 210 includes a plane portion 210*a* covering the entire bottom plane of base unit 201, and a side portion 210*b* extending upright from plane portion 210*a* to surround the outer perimeter of base unit 201. Plane portion 210*a* has the surface of a core 210*c* covered by a clad 210*d*. Side portion 210*b* is formed by clad 210*d*. A cushion-like foam material, for example AE polyethylene, is selected for core 210*c*. For clad 210*d*, a non-slip material including polyester and vinyl chloride resin is used. Clad 210*d* requires the property that the friction coefficient between position displacement inhibit member 210 and the seat of the vehicle is greater than the friction coefficient between the member forming the bottom plane of base unit 201 and the seat of the vehicle.

[Function•Advantage]

According to child seat 200 of the present embodiment, no impact will be applied, even in the case where an external force in the horizontal direction and the vertical direction is applied to child seat 200 since the head of the infant is enclosed by head guard pad 40A. Also, the provision of position displacement inhibit member 210 to inhibit position displacement of child seat 200 with respect to the seat of the vehicle also avoids the impact to the infant's head caused by the movement of child seat 200 per se.

Since head guard pad 40A will not be shifted in child seat 200, head guard pad 40A will not move laterally. The head of the infant will not bounce up. As a result, the infant's head can be guarded securely. The life and brain of an infant can be guarded without injuries to the skull, cerebral blood vessel, cervical spine and the like.

By removing flexible pad 50A of head guard pad 40A according to the growth of the infant, the mode shown in FIG. 17 can be employed. Also, flexible pad 10A can be removed to employ the mode shown in FIG. 18. Furthermore, impact absorption pad 20A and fixture pad 30A can be provided in a detachable manner with respect to child seat 200. It is also possible to form impact absorption pad 20A and fixture pad 30A in an integral piece.

A similar function and advantage can be obtained by applying the head guard pad shown in FIGS. 2-5 to child seat 200 including position displacement inhibit member 210 of the present embodiment.

From the standpoint of improving the permeability, a structure in which a plurality of through holes are provided at each pad of each of the above embodiments can be employed. Also, a structure in which a trench is provided extending up and down, vertically at the surface of the pad at the head side can also be employed.

Although head guard pad 40A is no longer required when the infant grows so that child seat 200 is always used in a seat position, position displacement inhibit member 210 can still be used. Since unnecessary movement of child seat 200 is eliminated even when the grown infant uses child seat 200, the head of the infant can be protected.

Each of the disclosed embodiments is only a respective example and is not to be taken as a limitation. The scope of the present invention is defined by the appended claims rather than by the description above. All changes that fall within limits and bounds of the claims, or equivalents of such metes and bounds are therefore intended to be embraced by the claims.

INDUSTRIAL APPLICABILITY

According to the child equipment of the present invention, the fixture member will not be displaced with respect to the child equipment. Therefore, the impact absorption layer and flexible pad will not move laterally or vertically. The head of an infant will not bounce up. As a result, the infant's head can be protected securely. The life and brain of an infant can be protected without injuries to the skull, cerebral blood vessel, cervical spine, and the like. Therefore, the present invention is applicable to all types of child equipment such as a child seat, a baby carriage, a baby bed, a baby carrier, and the like.

The invention claimed is:

1. A head guard structure of a child equipment, including a child equipment main unit (1) and a head guard pad (40A), wherein said child equipment main unit comprises
   a head supporting plane arranged so as to be adapted to support a head of an infant from below,
   a pair of sidewalls arranged so as to be adapted to face a temporal region of the head of the infant from respective sides, and
   a top wall arranged so as to be adapted to face a head top of the head of the infant, and wherein said head guard pad (40A) is disposed on said head support plane, and comprises a flexible pad (10A) having a configuration adapted to enclose respective temporal regions of the head and the head top of the infant, an impact absorption layer (20A) overlapping an outer side of said flexible pad, and having a configuration adapted to enclose the respective temporal regions of the head and the head top of the infant, and a fixture member (30A) formed of a material harder than a material of said impact absorption layer, filling up a gap between said impact absorption layer and said pair of sidewalls and said top wall of said child equipment main unit, wherein said impact absorption layer (20A) includes an upper portion that protrudes away from said head supporting plane beyond top portions of said sidewalls and said top wall of said child equipment main unit, and wherein said upper portion of said impact absorption layer includes a protruding region (20C) that protrudes inwardly over an upper edge of said flexible pad (10A) opposite said head supporting plane.

2. The head guard structure of a child equipment according to claim 1, wherein said fixture member (30A) includes a configuration filling up the gap from a corner portion of said child equipment main unit (1).

3. The head guard structure of a child equipment according to claim 1, wherein said fixture member (30A) has a height lower than a height of said impact absorption layer (20A).

4. The head guard structure of a child equipment according to claim 1, wherein said impact absorption layer (20A), said fixture member (30A), and said flexible pad (10A) have a cover applied thereon to form an integral piece.

5. The head guard structure of a child equipment according to claim 1, wherein said flexible pad is formed of a flexible material that is softer than said material of said impact absorption layer.

6. The head guard structure of a child equipment according to claim 5, wherein said flexible material comprises a soft sponge material or cotton material, said material of said impact absorption layer comprises urethane foam or polystyrene foam, and said material of said fixture member comprises hard polystyrene foam.

7. The head guard structure of a child equipment according to claim 1, wherein said protruding region is spaced above said upper edge of said flexible pad.

8. The head guard structure of a child equipment according to claim 1, wherein said protruding region (20C) of said upper portion of said impact absorption layer protrudes inwardly and laterally from an upright wall portion of said impact absorption layer in a direction toward the head top of the infant.

9. A head guard structure of a child equipment, including a child equipment main unit (1) and a head guard pad (40A), wherein said child equipment main unit comprises a head supporting plane arranged so as to be adapted to support a head of an infant from below, a pair of sidewalls arranged so as to be adapted to face a temporal region of the head of the infant from respective sides, and a top wall arranged so as to be adapted to face a head top of the head of the infant, and wherein said head guard pad (40A) is disposed on said head support plane, and comprises a flexible pad (10A) having a configuration adapted to enclose respective temporal regions of the head and the head top of the infant, an impact absorption layer (20A) overlapping an outer side of said flexible pad, and having a configuration adapted to enclose the respective temporal regions of the head and the head top of the infant, and a fixture member (30A) formed of a material harder than a material of said impact absorption layer, filling up a gap between said impact absorption layer and said pair of sidewalls and said top wall of said child equipment main unit, wherein said impact absorption layer (20A) includes an upper portion including a protruding region (20C) that protrudes inwardly over an upper edge of said flexible pad (10A) opposite said head supporting plane.

10. The head guard structure of a child equipment according to claim 9, wherein said fixture member (30A) includes a configuration filling up the gap from a corner portion of said child equipment main unit (1).

11. The head guard structure of a child equipment according to claim 9, wherein said fixture member (30A) has a height lower than a height of said impact absorption layer (20A).

12. The head guard structure of a child equipment according to claim 9, wherein said impact absorption layer (20A), said fixture member (30A), and said flexible pad (10A) have a cover applied thereon to form an integral piece.

13. The head guard structure of a child equipment according to claim 9, wherein said upper portion of said impact absorption layer (20A) protrudes away from said head supporting plane beyond top portions of said sidewalls and said top wall of said child equipment main unit.

14. The head guard structure of a child equipment according to claim 9, wherein said flexible pad is formed of a flexible material that is softer than said material of said impact absorption layer.

15. The head guard structure of a child equipment according to claim 14, wherein said flexible material comprises a soft sponge material or cotton material, said material of said impact absorption layer comprises urethane foam or polystyrene foam, and said material of said fixture member comprises hard polystyrene foam.

16. The head guard structure of a child equipment according to claim 9, wherein said protruding region is spaced above said upper edge of said flexible pad.

17. The head guard structure of a child equipment according to claim 9, wherein said protruding region (20C) of said upper portion of said impact absorption layer protrudes inwardly and laterally from an upright wall portion of said impact absorption layer in a direction toward the head top of the infant.

* * * * *